Dec. 24, 1968  M. J. NOVAK  3,417,991
MERRY-GO-ROUND HAVING TRACK SUPPORTED VEHICLES WITH SELECTIVE
BRAKE SYSTEMS FOR CONTROLLING THEIR SPEED
Filed Feb. 28, 1966
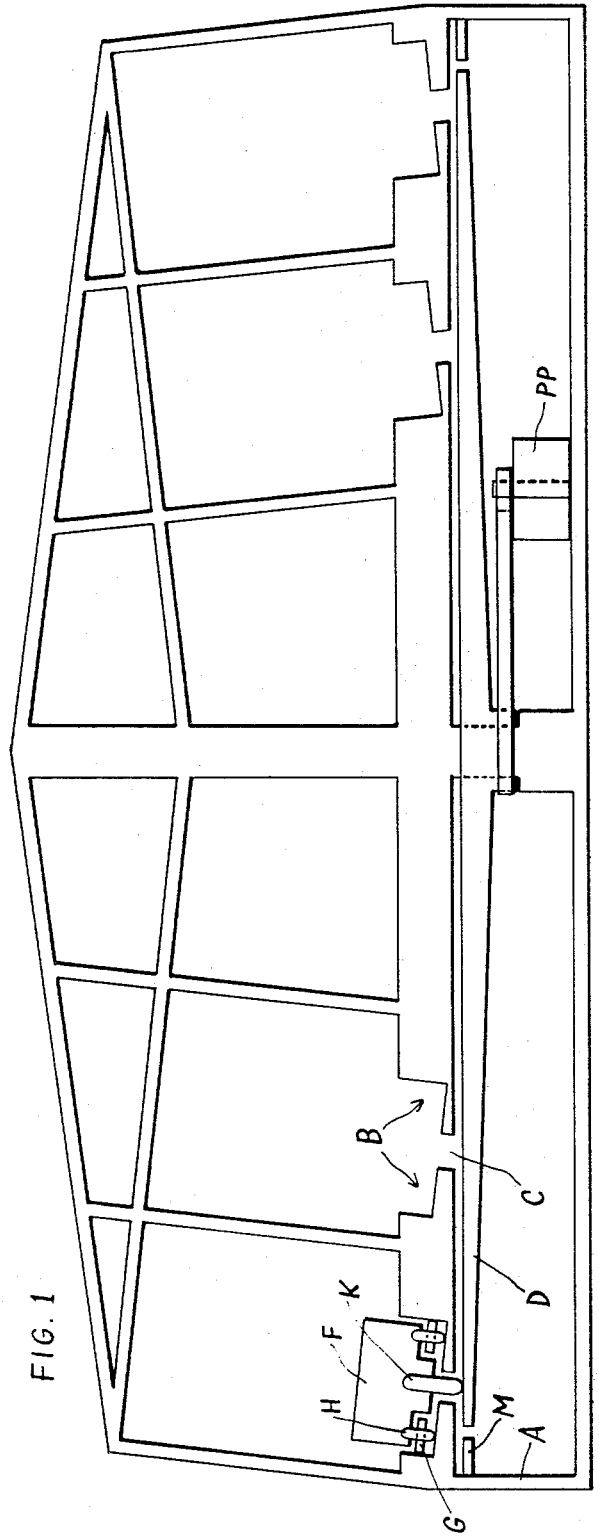
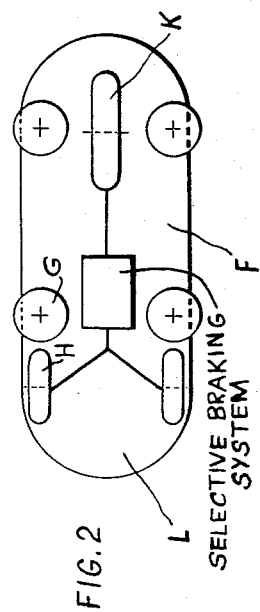

United States Patent Office 3,417,991
Patented Dec. 24, 1968

3,417,991
MERRY-GO-ROUND HAVING TRACK SUPPORTED
VEHICLES WITH SELECTIVE BRAKE SYSTEMS
FOR CONTROLLING THEIR SPEED
Milos Jindrich Novak, 100 Braebrook Ave.,
Pointe Claire, Quebec, Canada
Filed Feb. 28, 1966, Ser. No. 530,299
6 Claims. (Cl. 272—35)

ABSTRACT OF THE DISCLOSURE

A merry-go-round comprising a rotatable platform adapted to be driven by a power plant and stopped by a brake, with a track arranged above and independent of the platform, adapted to support and guide at least one vehicle having two supporting wheels on the track and one motion pick-up wheel supported on the platform. The supporting wheels and motion pick-up wheel have a selectively engageable braking system selectively engageable either with the motion pick-up wheel or the supporting wheels to cause the vehicle to be propelled with controllable speed by the rotating platform or to be stopped on the track, depending upon whether the motion pick-up wheel or the supporting wheels are braked.

The individually variable speed merry-go-round, subject of this invention, is a public amusement device which presents a high potential to the human interest and improves the previously known or used devices of similar kind in the following ways:

It gives an unprecedented possibility to the passenger to control personally and independently the speed of the individual vehicle in order to give or receive impacts to or from preceding or following vehicles.

By eliminating high electrical voltage installations previously used on devices of similar nature and by giving to the overall operator a constant and full control of the motion of the system, it provides to all concerned—passengers and operator—a high degree of safety.

By its simple construction this device offers a valuable possibility of supplying the public—especially the teenage public—with inexpensive amusement recreation which, according to the present sociological studies, will have an increasing importance in human communities.

Description

In the drawings which illustrate the embodiment of this invention FIGURE 1 is a diagrammatic elevation party in section of the compelte device, FIGURE 2 is a bottom view of the component vehicle on larger scale.

The device is a structural and mechanical assembly consisting of the following three main components:

Circular fixed structure A comprising one or several concentric circular track channels B. Each track channel is provided with a continuous slot C in its floor.

Power driven circular horizontal platform or table D rotating about the vertical central axis of the structure A and adapted to be engaged by a system of brakes M attached to the structure A. The radius of the table D is slightly longer than the radius of the outmost slot C. The power plant actuating the platform D is shown as PP.

Tricycle type vehicle F provided with four horizontal side guiding wheels G resting against the side walls of the track channel B, two supporting wheels H resting on the channel floor, and one entraining or motion-pick-up wheel K which is the third supporting wheel and rests on the table D through the slot C. The two wheels H are provided with low friction rims, while the motion-pickup wheel K has a high friction rim. A selective brake system, is installed on the three supporting wheels H, K. The brake system is operated by a single lever so that in one extreme position the lever applies the brake to the motion-pick-up wheel K only, in the opposite extreme position the lever applies the brake to the two supporting wheels H only. Half way between the two extreme positions the brake lever is in a neutral position where the brake is applied to neither wheel. Each end of the vehicle is protected by a highly elastic resilient bumper L. Several vehicles F will be placed in each track channel B.

The table D driven by the power plant PP and additionally controlled by the brakes M rotates from stop to maximum speed and vice versa under full command by the system operator.

The table D being in motion, each vehicle F can be transiently brought into the following three main kinematic situations by means of the selective brake lever operated by one of the vehicle passengers:

(a) when brake is applied to the motion-pick-up wheel K the vehicle F will be carried into motion by the table D and will be running in the channel B ready to give an impact to the preceding vehicle if this slows down;

(b) when brake is applied to the supporting wheels H the vehicle will slow down and will be ready to stop or receive a motion impulse from the following vehicle;

(c) when no brake is applied—lever in neutral—the vehicle will be free wheeling and slowing down to stop or to receive or transmit motion impulses to or from preceding or following vehicles depending of their kinematic situation.

While only one embodiment of the invention has been shown and described, it will be apparent that changes and modifications may be made therein. It is, therefore, to be understood that it is not intended to limit the invention to the embodiment shown. Thus, for instance, the track channel, instead of being evenly horizontal and circular, can have any other suitable variation of shape or inclination, with resulting surprise horizontal, vertical or intermediate deviations of the vehicle. It is also feasible to impart motion to the track channel, in the same direction as the motion of the platform or against it, or in any other direction.

The embodiments of the invention in which an exclusive property or privilege is claimed are defined as follows:

1. A merry-go-round comprising a rotatable platform, driving means adapted to impart rotating motion to said platform, braking means adapted to stop the rotating motion of said platform, a track arranged above said platform independently of it and adapted to support and guide at least one vehicle carrying entraining means adapted to be brought selectively in and out of driving connection with said platform, said vehicle being provided with supporting means riding on said track and with a braking system selectively engageable either with said entraining means or said supporting means thereby to cause said vehicle to be entrained with controllable speed by said platform or to be stopped on said track.

2. A merry-go-round according to claim 1, in which said track is provided lengthwise with a continuous slot and said vehicle is supported by three wheels, two of which ride on the track on either side of the said slot, and the third wheel, serving as an entraining wheel, protrudes through said slot and engages said rotatable platform.

3. A merry-go-round as defined in claim 2, in which the entraining wheel is provided with a high friction rim, the other two wheels having low friction rims.

4. A merry-go-round as defined in claim 2, in which said braking system comprises a normally inoperative brake system adapted to be brought by the vehicle occupant selectively into engagement either with said entraining wheel or with the other two supporting wheels.

5. A merry-go-round as defined in claim 1, in which several tracks for guiding and supporting said vehicles are arranged above the rotatable platform.

6. A merry-go-round as defined in claim 1, in which said vehicle is provided with elastic bumpers on both ends.

References Cited

UNITED STATES PATENTS

| | | |
|---|---|---|
| 1,491,307 | 4/1924 | Lane et al. _____ 272—35 |
| 2,205,459 | 6/1940 | Bardega. |
| 2,643,885 | 6/1953 | Ford. |

ANTON O. OECHSLE, *Primary Examiner.*

A. W. KRAMER, *Assistant Examiner.*

U.S. Cl. X.R.

272—43, 46; 104—35, 53; 273—86